United States Patent
Wang et al.

(10) Patent No.: US 11,534,934 B2
(45) Date of Patent: Dec. 27, 2022

(54) FILM CUTTING METHOD AND CUTTING DEVICE, COMPOSITE FILM, BACKLIGHT MODULE AND DISPLAY DEVICE

(71) Applicants: HEFEI BOE DISPLAY LIGHTING CO., LTD., Anhui (CN); BOE TECHNOLOGY GROUP CO., LTD., Beijing (CN)

(72) Inventors: Peina Wang, Beijing (CN); Zhi Zhu, Beijing (CN)

(73) Assignees: HEFEI BOE DISPLAY LIGHTING CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 356 days.

(21) Appl. No.: 16/612,487

(22) PCT Filed: Apr. 9, 2019

(86) PCT No.: PCT/CN2019/081870
§ 371 (c)(1),
(2) Date: Nov. 11, 2019

(87) PCT Pub. No.: WO2019/218802
PCT Pub. Date: Nov. 21, 2019

(65) Prior Publication Data
US 2021/0331344 A1    Oct. 28, 2021

(30) Foreign Application Priority Data

May 18, 2018 (CN) .......................... 201810480680.X

(51) Int. Cl.
*B26D 7/27*     (2006.01)
*B26D 1/06*     (2006.01)
(Continued)

(52) U.S. Cl.
CPC ............... *B26D 7/27* (2013.01); *B26D 1/065* (2013.01); *B26D 1/095* (2013.01); *G02B 5/04* (2013.01)

(58) Field of Classification Search
CPC . B26D 7/27; B26D 7/34; B26D 1/065; B26D 1/095; B26D 1/04; B26D 1/045; G02B 5/04
(Continued)

(56) References Cited

U.S. PATENT DOCUMENTS 4,448,808 A * 5/1984 Pearl .................. A41H 3/08
83/940
5,518,569 A * 5/1996 Achilles .............. B26D 7/20
156/355
(Continued)

FOREIGN PATENT DOCUMENTS

CN         2898869 Y     5/2007
CN       101117033 A     2/2008
(Continued)

OTHER PUBLICATIONS

First Office Action for Chinese Application No. 201810480680.X, dated Apr. 28, 2019, 6 Pages.
(Continued)

*Primary Examiner* — Phong H Nguyen
(74) *Attorney, Agent, or Firm* — Brooks Kushman P.C.

(57) ABSTRACT

The present disclosure provides a film cutting method, a film cutting device, a composite film, a backlight module and a display device. The film material cutting method includes: using a cutting tool provided with a viscous material to cut a composite film that includes at least two laminated optical films, with the viscous material on the cutting tool being
(Continued)

transferred to a cutting end surface of the composite film during cutting; and, curing the viscous material on the cutting end surface.

5 Claims, 3 Drawing Sheets

(51) Int. Cl.
   *B26D 1/09* (2006.01)
   *G02B 5/04* (2006.01)
(58) Field of Classification Search
   USPC .................................................. 428/411.1
   See application file for complete search history.

(56) References Cited

U.S. PATENT DOCUMENTS

2003/0035872 A1* 2/2003 Giraldo .................. A23L 19/03
                                                      426/438
2005/0266131 A1* 12/2005 King ...................... A23L 13/76
                                                      426/534
2013/0248099 A1   9/2013 Shimizu et al.

FOREIGN PATENT DOCUMENTS

| | | |
|---|---|---|
| CN | 101571640 A | 11/2009 |
| CN | 101737735 A | 6/2010 |
| CN | 103325733 A | 9/2013 |
| CN | 103552354 A | 2/2014 |
| CN | 106226848 A | 12/2016 |
| CN | 107650196 A | 2/2018 |
| CN | 108687816 A | 10/2018 |
| JP | 2002351343 A | 12/2002 |
| JP | 2009113123 A | 5/2009 |
| JP | 2013076934 A | 4/2013 |
| WO | 2017134754 A1 | 8/2017 |

OTHER PUBLICATIONS

International Search Report and Written Opinion for Application No. PCT/CN2019/081870, dated Jul. 16, 2019, 11 Pages.

* cited by examiner

FILM CUTTING METHOD AND CUTTING DEVICE, COMPOSITE FILM, BACKLIGHT MODULE AND DISPLAY DEVICE

CROSS-REFERENCE TO RELATED APPLICATIONS

This application is the U.S. national phase of PCT Application No. PCT/CN2019/081870 filed on Apr. 9, 2019, which claims priority to Chinese Patent Application No. 201810480680.X, filed on May 18, 2018, which are incorporated herein by reference in their entireties.

TECHNICAL FIELD

The present application relates to the technical field of film cutting, in particular to a film cutting method, a film cutting device, a composite film, a backlight module and a display device.

BACKGROUND

With the development trend of lightening and thinning in the electronic display industry, a plurality of prism sheets in one backlight module has been replaced by a composite prism sheet. The composite prism sheet refers to a diaphragm that is formed by binding two or more prism sheets together with a glue, which can reduce the thickness of the film and simplify the assembly process.

In the development of the backlight module of a mobile phone or a tablet computer, in order to bond a liquid crystal panel to the backlight module, a ring tape is disposed on an upper surface of the composite prism sheet of the backlight module. If the product has problems and needs to be reworked, when the top ring tape is torn off, the composite prism sheet under the ring tape may also be torn off, which will cause delamination of the edge of the composite prism sheet, and then affect the production efficiency and increase the cost.

SUMMARY

According to a first aspect, one embodiment of the present disclosure provides a film cutting method, including: using a cutting tool provided with a viscous material to cut a composite film that includes at least two laminated optical films, with the viscous material on the cutting tool being transferred to a cutting end surface of the composite film during cutting; and, curing the viscous material on the cutting end surface.

Optionally, the using a cutting tool provided with a viscous material to cut a composite film that includes at least two laminated optical films, includes: spraying the viscous material on the cutting tool when the cutting tool is at an initial position; and moving the cutting tool to a cutting position and cutting the composite film.

Optionally, the curing the viscous material on the cutting end surface, includes: conveying the composite film to which the viscous material is transferred, to a curing mechanism; and curing the viscous material transferred to the composite film in the curing mechanism.

Optionally, the spraying the viscous material on the cutting tool when the cutting tool is at an initial position, includes: spraying ultraviolet curable glue onto the cutting tool which is at the initial position; the curing the viscous material transferred to the composite film in the curing mechanism, includes: irradiating the ultraviolet curable glue on the cutting end surface by an ultraviolet light source in the curing mechanism.

According to a second aspect, one embodiment of the present disclosure provides a film cutting device, including: a cutting mechanism including a cutting tool provided with viscous material; a feeding mechanism configured to convey a composite film that includes at least two laminated optical films to the cutting mechanism; and, a cutting mechanism configured to, after the cutting tool cuts the composite film, cure the viscous material that is transferred from the cutting tool to a cutting end surface of the composite film.

Optionally, the cutting mechanism further includes: a cutting platform configured to support the composite film; and the cutting platform is below the cutting tool.

Optionally, there is a plurality of cutting tools; the plurality of cutting tools are spaced apart from each other and located above the cutting platform, and correspond to a position of the cutting platform; and the plurality of cutting tools are arranged along a length direction and a width direction of the composite film.

Optionally, the device further includes: a spraying mechanism. The spraying mechanism includes a plurality of nozzles corresponding to the plurality of the cutting tools; the plurality of nozzles are configured to spray the viscous material on the corresponding cutting tools, respectively.

Optionally, the viscous material is an ultraviolet curable glue; the curing mechanism includes: an ultraviolet curing groove and a plurality of ultraviolet light sources; the plurality of ultraviolet light sources are disposed at an inner wall of the ultraviolet curing groove and spaced apart from each other.

Optionally, a shape of a cross section of the ultraviolet curing groove is a square shape.

Optionally, the device further includes: a transport mechanism located between the cutting mechanism and the curing mechanism.

Optionally, the transport mechanism includes two spaced conveying wheels and a conveying belt disposed around the two conveying wheels.

According to a third aspect, one embodiment of the present disclosure provides a composite film including: at least two laminated optical films; a first viscous material disposed between the at least two laminated optical films and binding the at least two laminated optical films together; and a second viscous material disposed on a lateral end surface of the at least two laminated optical films.

Optionally, the second viscous material is disposed on the lateral end surface of the at least two laminated optical films along an outer periphery of the at least two laminated optical films.

According to a fourth aspect, one embodiment of the present disclosure provides a backlight module including the above composite film.

According to a fifth aspect, one embodiment of the present disclosure provides a display device including the above backlight module.

DETAILED DESCRIPTION

Figure 1:
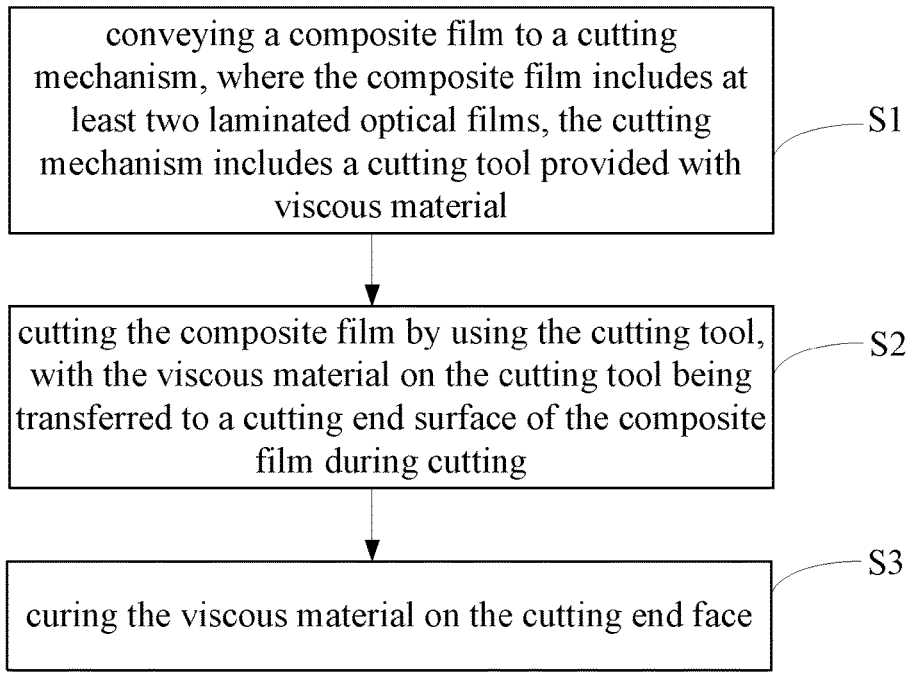
FIG. 1 is a flow chart of a film cutting method according to an embodiment of the present disclosure.

In order to make the objects, the technical solutions and the advantages of the present disclosure more apparent, the technical solutions of embodiments of the present disclosure will be described hereinafter in a clear and complete manner in conjunction with the drawings and the embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

Hereinafter, a film cutting method according to an embodiment of the present disclosure will be specifically described below with reference to the accompanying drawings.

As shown in FIG. 1 to FIG. 4, the film cutting method of the embodiment of the present disclosure includes the following steps:

S1, conveying a composite film to a cutting mechanism, where the composite film includes at least two laminated optical films, the cutting mechanism includes a cutting tool provided with viscous material;

S2, cutting the composite film by using the cutting tool, with the viscous material on the cutting tool being transferred to a cutting end surface of the composite film during cutting;

S3, curing the viscous material on the cutting end face.

In other words, according to the film cutting method of the embodiment of the present disclosure, a composite film 50 can be provided, and the composite film 50 can be conveyed to a cutting mechanism 10, and then the composite film 50 can be cut by using the cutting mechanism 10. The composite film 50 may be composed of at least two laminated optical films. The cutting mechanism 10 may include a cutting tool 12. The cutting tool 12 may be provided with viscous material. When using the cutting tool 12 to cut the composite film 50, the viscous material on the cutting tool 12 can be transferred to a cutting end face of the composite film 50. Then, the viscous material on the cutting end face can be cured, so that cutting end faces around the composite film 50 can be joined together, thereby effectively preventing the composite film 50 from being peeled off.

Therefore, in the embodiment of the present disclosure, when the cutting mechanism 10 cuts the composite film 50, the viscous material can be transferred to the cutting end surface of the composite film 50, and then the viscous material on the cutting end surface is cured. In this way, end faces around the composite film 50 are joined together to prevent the composite film 50 from being peeled off. Thus, the film cutting method is simple, easy to operate and control, and is suitable for large-scale promotion and application.

In one embodiment of the present disclosure, a feeding mechanism conveys the composite film 50 to the cutting mechanism 10. In the feeding mechanism, the composite film 50 is in the form of a coil.

That is, the feeding mechanism can convey the composite film 50 to the cutting mechanism 10, and the composite film 50 can be in the form of a coil in the feeding mechanism. The coiled composite film 50 facilitates the transport of the composite film 50, which facilitates transport of the composite film 50 to the cutting mechanism 10 for cutting.

In some embodiments of the present disclosure, the cutting tool 12 is movable between an initial position and a cutting position. The step of cutting the composite film 50 by using the cutting tool 12 includes:

when the cutting tool 12 is at the initial position, spraying the cutting tool 12 with the viscous material;

moving the cutting tool 12 to the cutting position and cutting the composite film 50, with the viscous material on the cutting tool 12 being transferred to the cutting end face of the composite film 50 during cutting.

In other words, the cutting tool 12 can be moved between the initial position and the cutting position. When the cutting tool 12 is at the initial position, the cutting tool 12 of the cutting mechanism 10 can be sprayed with the viscous material by a spraying mechanism. When the cutting tool 12 sprayed with the viscous material is moved to the cutting position, the cutting tool 12 can cut the composite film 50. Meanwhile, the viscous material sprayed on the cutting tool 12 can be transferred to the cutting end surface of the composite film 50, so that the cutting end faces around the composite film 50 are bonded together by the viscous material, thereby effectively preventing the composite the film 50 from being peeled off.

In the embodiment of the present disclosure, in addition to spraying the viscous material on the cutting tool 12, the cutting tool 12 may be provided with the viscous material in other ways, such as coating.

In one embodiment of the present disclosure, the step of curing the viscous material on the cutting end face includes:

conveying the composite film 50 with transferred viscous material to the curing mechanism 40;

curing the viscous material transferred to the composite film 50 in a curing mechanism 40.

In other words, in the process of curing the viscous material on the cutting end face, the composite film 50 with the transferred viscous material is first conveyed to the curing mechanism 40, and then the curing mechanism 40 may cure the viscous material transferred to the composite film 50. In this way, cutting end faces around the composite film 50 are bonded together by the viscous material, thereby effectively preventing the composite film 50 from peeling off.

Optionally, in some embodiments of the present disclosure, the viscous material may be UV curable glue.

In other words, the viscous material can employ UV curable adhesive. The UV curable adhesive has excellent adhesive properties, and the UV curable adhesive is easily cured within a short curing time, which is advantageous for increasing a curing rate of the composite film 50.

In summary, according to the film cutting method of the embodiment of the present disclosure, when the cutting mechanism 10 cuts the composite film 50, the viscous material can be transferred to the cutting end face of the composite film 50, and then the viscous material on the cutting end face can be cured. Thus, the end faces of the composite film 50 are bonded together, thereby effectively preventing the composite film 50 from being peeled off. Therefore, the film cutting method is simple, easy to operate and control, and is suitable for large-scale promotion and application.

Figure 2:
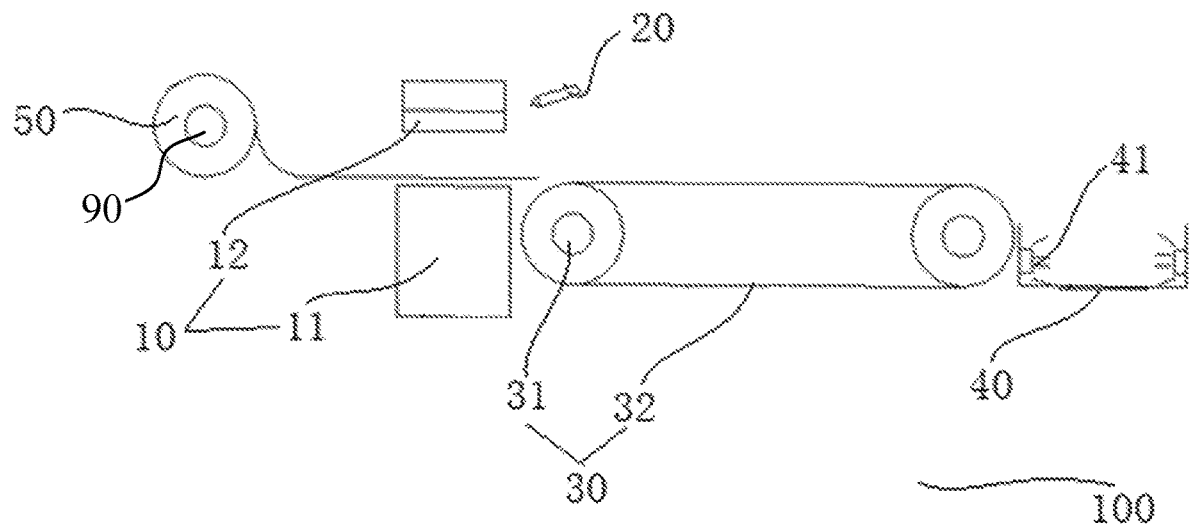
FIG. 2 is a schematic structural view of a film cutting device according to an embodiment of the present disclosure.
Figure 3:
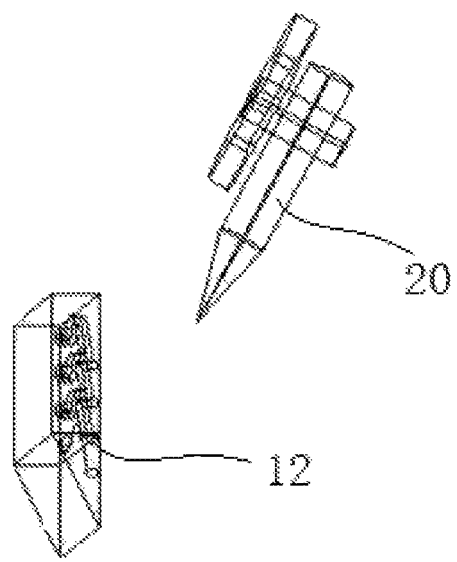
FIG. 3 is a schematic structural view of a cutting tool and a nozzle of the film cutting device according to an embodiment of the present disclosure.
Figure 4:
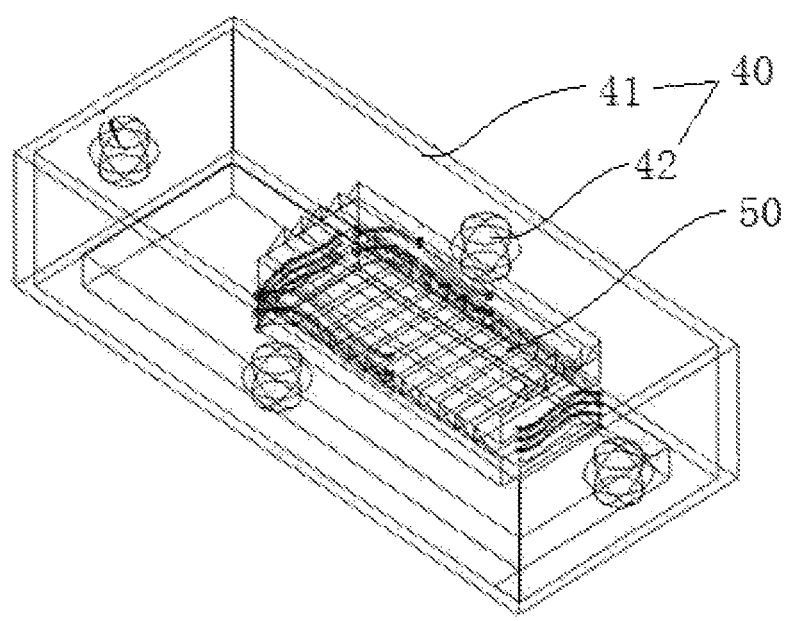
FIG. 4 is a schematic structural view of a curing device of the film cutting device according to an embodiment of the present disclosure.

As shown in FIG. 2 to FIG. 4, an embodiment of the present disclosure further provides a film cutting device 100 including a feeding mechanism 90, a cutting mechanism 10 and a curing mechanism 40.

Specifically, the feeding mechanism 90 is configured to convey a composite film 50 to the cutting mechanism 10. In one embodiment, the feeding mechanism 90 may be a roller or a shaft. The composite film 50 may be disposed around the roller or the shaft. The composite film 50 includes at least two laminated optical films. The cutting mechanism 10 includes a cutting tool 12. The cutting tool 12 is provided with viscous material. When using the cutting tool 12 to cut the composite film 50, the viscous material on the cutting tool 12 can be transferred to a cutting end face of the composite film 50. The curing mechanism 40 is configured to cure the viscous material on the cutting end face.

In other words, the composite film cutting device 100 according to an embodiment of the present disclosure is mainly composed of the feeding mechanism 90, the cutting mechanism 10 and the curing mechanism 40. The feeding mechanism may be configured to convey the composite film 50. The composite film 50 may be composed of at least two laminated optical films. The cutting mechanism 10 may include a cutting tool 12. The cutting tool 12 may be provided with viscous material. When using the cutting tool 12 to cut the composite film 50, the viscous material on the cutting tool 12 can be transferred to a cutting end face of the composite film 50. Then, the viscous material on the cutting end face of the composite film 50 can be cured by the curing mechanism 40, so that cutting end faces around the composite film 50 can be joined together by the viscous material, thereby effectively preventing the composite film 50 from being peeled off. Thus, the film cutting device is simple, easy to operate and control, and is suitable for large-scale promotion and application.

According to an embodiment of the present invention, the film cutting device 100 further includes a transport mechanism 30.

Specifically, the transport mechanism 30 is configured to transport the composite film 50 after cutting. The transport mechanism 30 is located between the cutting mechanism 10 and the curing mechanism 40.

In other words, the film cutting device 100 may further include the transport mechanism 30. The transport mechanism 30 can be configured to transport the composite film 50 after cutting. The transport mechanism 30 may be installed between the cutting mechanism 10 and the curing mechanism 40. The transport mechanism 30 is mainly composed of two spaced conveying wheels 31 and a conveying belt 32. The composite film 50 after cutting can be conveyed to the curing mechanism 40 by the conveying wheels 31 and the conveying belt 32.

According to one embodiment of the present disclosure, the cutting mechanism 10 includes a cutting platform 11 and a cutting tool 12.

Specifically, the cutting platform 11 is configured to support the composite film 50. The cutting platform 11 is located below the cutting tool. There is a plurality of cutting tools. The plurality of cutting tools 12 are spaced apart from each other and located above the cutting platform 11, and correspond to the position of the cutting platform 11. The plurality of cutting tools 12 are arranged along a length direction and a width direction of the composite film 50.

In other words, the cutting mechanism 10 is mainly composed of the cutting platform 11 and a plurality of cutting tools 12. The cutting platform 11 may be located below the plurality of cutting tools 12 to facilitate cutting of the composite film 50 by the plurality of cutting tools 12. The plurality of cutting tools 12 may be installed above the cutting platform 11 and spaced from each other. Positions of the plurality of cutting tools 12 may correspond to the positions of the cutting platforms 11, respectively. The plurality of cutting tools 12 may be arranged along the length direction and the width direction of the composite film 50, respectively, thereby facilitate cutting of the composite film 50 by the plurality of cutting tools 12. The plurality of cutting tools 12 may be moved between their respective initial positions and cutting positions. Each of the plurality of cutting tools 12 provided with the viscous material may be moved from the initial position to the cutting position and then cuts the composite film in the cutting position. Meanwhile, the plurality of cutting tools 12 provided with the viscous material can transfer the viscous material to the cutting end faces of the composite film 50, so that the cutting end faces around the composite film 50 are bonded together by the viscous material, thereby effectively preventing the composite film 50 from peeling off.

Optionally, in some embodiments of the present disclosure, the film cutting device 100 further includes a spraying mechanism. The spraying mechanism includes a plurality of nozzles 20 corresponding to the plurality of cutting tools 12. Each nozzle 20 can be used to spray the viscous material onto an inside of the corresponding cutting tool 12.

In other words, the film cutting device 100 may further include the spraying mechanism, the spraying mechanism may include a plurality of nozzles 20, and the plurality of nozzles 20 may respectively correspond to the plurality of cutting tools 12. In this way, each cutting tool 12 may be sprayed with the viscous material by the corresponding nozzle 20.

In some optional embodiments of the present disclosure, there may be four cutting tools 12 and four nozzles 20. The four cutting tools 12 are arranged in a rectangular shape.

In other words, the number of the cutting blades 12 may be four, and the number of the nozzles 20 may be four. The four cutting tools 12 may be arranged in a rectangular shape to ensure that the composite film 50 cut by the cutting tool 12 has a rectangular shape.

In some embodiments of the present disclosure, the viscous material is ultraviolet curing glue, and the curing mechanism 40 includes an ultraviolet curing groove 41 and a plurality of ultraviolet light sources 42. A shape of a cross section of the ultraviolet curing groove 41 is a square shape. A plurality of spaced ultraviolet light sources 42 is disposed at an inner wall of the ultraviolet curing groove 41 to cure the ultraviolet curable glue on the composite film 50.

In other words, the viscous material may employ UV curable adhesive. The UV curable adhesive has excellent adhesive properties, and the UV curable adhesive is easily cured within a short curing time, which is advantageous for increasing a curing rate of the composite film 50. The curing mechanism 40 is mainly composed of the ultraviolet curing groove 41 and the ultraviolet light sources 42. The shape of the cross section of the ultraviolet curing groove 41 may be a square shape that is corresponding to a shape of the composite film 50 after cutting. A plurality of spaced ultraviolet light sources 42 may be disposed on the inner wall of the ultraviolet curing groove 41. The plurality of ultraviolet light sources 42 can cure the ultraviolet curable glue on the cutting end faces of the composite film 50.

Optionally, four spaced ultraviolet light sources 42 may be disposed around the inner wall of the ultraviolet curing groove 41. The four ultraviolet light sources 42 may be corresponding to four cutting end surfaces of the composite film 50, respectively. The four ultraviolet light sources 42 may cure the ultraviolet curable glue on the four cutting end faces of the composite film 50, respectively, so that the cutting end surfaces of the composite film 50 are bonded into a whole through the viscous material, thereby effectively preventing the composite film 50 from being peeled off.

In summary, the film cutting device 100 according to the embodiment of the present disclosure has a simple structure, is easy to operate, and is suitable for large-scale promotion and application.

As shown in FIG. 1 to FIG. 4, one embodiment of the present disclosure further provides a composite film, which may be formed by the method of the above embodiment. The composite film may be composed of at least two laminated optical films and viscous material bonded to cutting end faces of the composite film. Since the film cutting method according to the embodiment of the present disclosure has the above-described technical effects, the composite film according to the embodiment of the present disclosure also has a corresponding technical effect, i.e., effectively preventing the composite film from peeling off.

Figure 5:
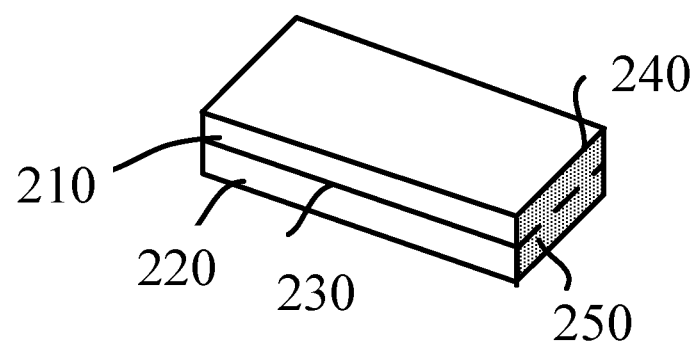
FIG. 5 is a schematic view of a composite film according to an embodiment of the present disclosure.

In one embodiment, as shown in FIG. 5, the composite film includes: at least two laminated optical films 210, 220; first viscous material 230 disposed between the at least two laminated optical films and binding the at least two laminated optical films together; and a second viscous material 250 disposed on a lateral end surface 240 of the at least two laminated optical films.

Figure 6:
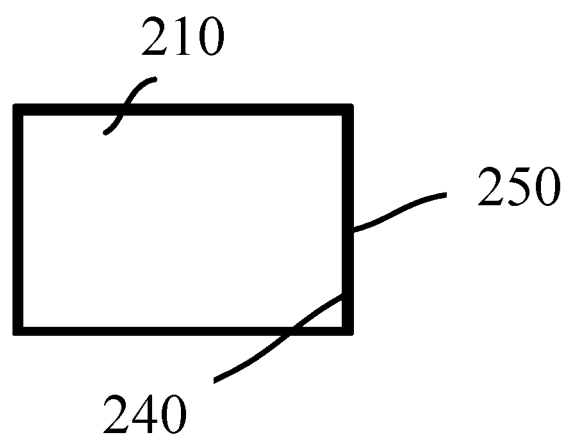
FIG. 6 is a top view of the composite film according to an embodiment of the present disclosure.

As shown in FIG. 6, the second viscous material 250 may be disposed on the lateral end surface of the at least two laminated optical films along an outer periphery of the at least two laminated optical films.

One embodiment of the present disclosure further provides a backlight module, which includes the composite film in the above embodiment. Since the composite film according to the embodiment of the present disclosure has the above technical effects, the backlight module according to the embodiment of the present disclosure also has the corresponding technical effect, i.e., effectively preventing the composite film from peeling off.

The above are merely the optional embodiments of the present disclosure. It should be noted that, a person skilled in the art may make improvements and modifications without departing from the principle of the present disclosure, and these improvements and modifications shall also fall within the scope of the present disclosure.

What is claimed is:

1. A film cutting device, comprising:
   a cutting mechanism including a cutting tool provided with viscous material;
   a feeding mechanism configured to convey a composite film that includes at least two laminated optical films to the cutting mechanism;
   a curing mechanism configured to, after the cutting tool cuts the composite film, cure the viscous material that is transferred from the cutting tool to a cutting end surface of the composite film; and
   a spraying mechanism;
   wherein the cutting mechanism further includes a cutting platform configured to support the composite film, and the cutting platform is below the cutting tool;
   wherein there is a plurality of cutting tools, the plurality of cutting tools are spaced apart from each other and located above the cutting platform, and correspond to a position of the cutting platform, and the plurality of cutting tools are arrangeable along a length direction and a width direction of the composite film; and
   wherein the spraying mechanism includes a plurality of nozzles corresponding to the plurality of the cutting tools, the plurality of nozzles are configured to spray the viscous material on the corresponding cutting tools, respectively.

2. The device according to claim 1, wherein the viscous material is an ultraviolet curable glue;
   the curing mechanism includes: an ultraviolet curing groove and a plurality of ultraviolet light sources; the plurality of ultraviolet light sources are disposed at an inner wall of the ultraviolet curing groove and spaced apart from each other.

3. The device according to claim 2, wherein a shape of a cross section of the ultraviolet curing groove is a square shape.

4. The device according to claim 1, further comprising: a transport mechanism located between the cutting mechanism and the curing mechanism.

5. The device according to claim 4, wherein the transport mechanism includes two spaced conveying wheels and a conveying belt disposed around the two conveying wheels.

* * * * *